Patented May 11, 1937

2,080,106

UNITED STATES PATENT OFFICE 2,080,106

PROCESS FOR THE PREPARATION OF ANTHRAQUINONE COMPOUNDS AND A PRODUCT PRODUCED THEREBY

Earl Edson Beard, Milwaukee, Wis., assignor to E. I. du Pont de Nemours & Company, Wilmington, Del., a corporation of Delaware No Drawing. Application March 21, 1935, Serial No. 12,248

9 Claims. (Cl. 260—60)

This invention relates to carbon compounds and processes for their production. More particularly it relates to dye intermediates, dyes and colored compounds of the anthraquinone series. It especially contemplates anthraquinone derivatives having the probable formula:

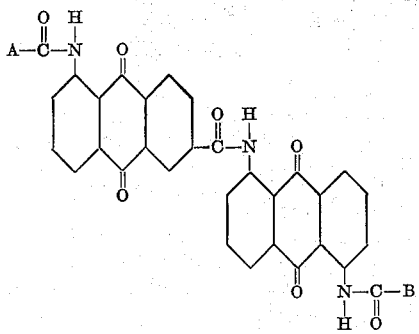

in which A represents a carbon compound residue, radical or nucleous and B represents a nucleus, radical or residue of a carbon compound, and the production of such compounds from 1-amino-6-anthraquinoyl - amino - (1') - anthraquinone-5'-amine probably having the formula:

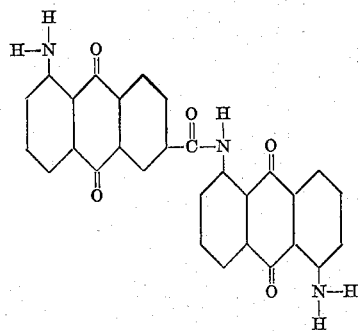

The production of 1-nitro-anthraquinone-6-carboxylic acid is described by Eckert (1914 Monats. für Chemie 35 289), by Beard & Lulek (U. S. of America Patent 1,991,191, Feb. 12, 1935) and by Beard (U. S. of America Patent 1,985,232, Dec. 25, 1934).

In an earlier U. S. of America Patent 2,001,701, issued May 21, 1935, I have disclosed the conversion of 1-nitro-anthraquinone-6-carboxylic acid to the corresponding acid halide and condensation of the resultant with various amines by splitting out hydrogen halides. In another earlier U. S. of America Patent 2,001,702, issued May 21, 1935, I have disclosed the reduction of the last mentioned nitro compound to the corresponding amine followed by acylation.

During my researches above described, it was discovered that the compounds having the formula first above set out, have especially desirable properties as anthraquinone vat dyes and colors.

This invention had for an object the production of new and valuable chemical compounds. Other objects were to produce new dyes, new dye intermediates, new vat colors, new color substances and to produce such compounds by new chemical processes. A general advance in the art and other objects which will appear hereinafter are also contemplated.

The foregoing objects and related ends are accomplished in a manner set out in the following description in which details of what is believed to be the best mode for carrying out the invention are disclosed.

The invention will be further understood from a consideration of the following detailed description and specific examples in which the parts are given by weight.

PREPARATION OF 1-NITRO-6-ANTHRAQUINOYL-AMINO-1'-ANTHRAQUINONE-5'-AMINO COMPOUNDS

Example I

To 10 parts of 1,5-diamino-anthraquinone dissolved in 200 parts of nitrobenzene, there was slowly added (over a period of ½ to 1 hour) at a temperature of 210°–215° C., 13.3 parts of 1-nitro-anthraquinone-6-carbonyl chloride. After the addition of the acid chloride was completed the temperature was maintained at 200°–210° C. for 20–30 minutes. The mixture was then allowed to cool after which it was diluted with 5 parts of ethyl alcohol and filtered at 30°–50° C. The filter cake was first washed with a nitrobenzene ethyl alcohol solution and thereafter washed with ethyl alcohol alone.

Example II

To 10 parts of 1,5-diamino-anthraquinone dissolved in 200 parts of nitrobenzene, there was slowly added (over a period of 1–2 hours) at a temperature of 170° C., 13.3 parts of 1-nitro-anthraquinone-6-carbonyl chloride. After the addition of the acid chloride was completed the temperature was maintained at 170° C. for 30 minutes to 1 hour. The mixture was then allowed to cool to 30°–40° C. and filtered directly. The filter cake was first washed with a nitrobenzene ethyl alcohol solution and thereafter washed with ethyl alcohol alone.

When desirable, the 1-nitro-anthraquinone-6-carboxylic acid halide (for example, the chloride or the bromide) may be dissolved in a suitable solvent for example nitrobenzene, before its addition to the nitrobenzene solution of the 1:5-diamino-anthraquinone.

The best results have been obtained when the condensation of the 1-nitro-anthraquinone-6-carboxylic acid halide and the 1,5-diamino-anthraquinone was carried out in such a way that the concentration of unreacted acid halide was maintained at a minimum in the reaction mass. As will be clear to one skilled in the art, this condition is obtained by proper coordination of reaction temperature and rate of addition of acid halide to the diamine.

It is sometimes convenient to employ acid binding agents such as sodium carbonate, sodium bicarbonate, pyridine, alkyl anilines and the like, during the above disclosed acylation step.

*Example III*

To 10 parts of 1,5-diamino-anthraquinone dissolved in 200 parts of ortho-di-chloro-benzene at the boiling point (ca. 180° C.) there was slowly added (over a period of 1 hour) 13.3 parts of 1-nitro-anthraquinone-6-carbonyl chloride. After this addition, the temperture was maintained at 175°–180° C. for 30 minutes to 1 hour, after which time the reaction mass was allowed to cool to 30°–50° C., at which temperature it was filtered and washed first with ortho-di-chloro-benzene and then with ethyl alcohol, after which it was dried. The nitro-amino compound obtained appeared to be substantially identical with that prepared according to the process followed in Example I.

PREPARATION OF 1-AMINO-6-ANTHRAQUINOYL-AMINO-(1')-ANTHRAQUINONE-5'-AMINE COMPOUNDS

*Example IV*

The nitro-amino compound prepared according to Example II was suspended in 1500–2000 parts of a 30% ethyl alcohol solution and thereafter there was added 100 parts of a 30–35% sodium sulfhydrate solution. The whole was then heated at the boiling point during 2–4 hours, after which the diamino compound obtained was filtered while hot, washed with hot water and dried. The product so obtained is identical with that prepared according to Example V.

When desired, further purification of the diamino compound may be obtained in the manner following: The compound to be purified is dissolved in concentrated sulfuric acid followed by dilution with water until the diamine separates out of solution as the sulfate derivative. This derivative is filtered, washed with dilute sulfuric acid and then heated in a large volume of water. From the resultant the purified diamine may be filtered and after washing with water and drying is ready for further use.

*Example V*

The washed filter cake produced in Example I was placed in 800–1000 parts of water and heated to 45°–50° C. Thereafter 23.5 parts of sodium hydroxide was added. This addition was followed by the addition of 27 parts of sodium hydrosulfite. The resulting vat was held at 55°–60° C. for 45 minutes to 1 hour. At the expiration of this time 10 parts of Sitol (sodium nitrobenzene sulfonate) was added and the mass heated at 80°–85° C. for one-half hour. The resulting diamine was filtered while hot, first washed with hot water and finally washed with ethyl alcohol and dried. If desired the nitro group may be converted to the amino group by employing sodium sulfide or any other suitable reducing agent.

ACYLATION OF 1-AMINO-6-ANTHRAQUINOYL-AMINO-(1')-ANTHRAQUINONE-5'-AMINO COMPOUNDS

*Example VI*

The dried filter cake produced according to Example V was suspended in 250 parts of nitrobenzene and heated for one-half hour at 110° C. Thereafter 12 parts of benzoyl chloride were added and the temperature maintained at 150° C. for two hours. Benzoylation of both of the amino groups in the starting compound being complete the mass was filtered at 60° C. and washed with nitrobenzene. The filter cake was thereafter washed with alcohol and dried. The resulting product was a yellow crystalline powder which produced a yellow sulfuric acid solution and which dyed cotton from a Bordeaux-colored alkaline hydrosulfite vat in yellow shades possessing excellent fastness properties.

*Example VII*

Ten (10) parts of 1-amino-6-anthraquinoyl-amino-(1')-anthraquinone-5'-amine was heated with 10 parts of ortho-chloro-benzoyl chloride in 250 parts of nitrobenzene at 160° C. for two hours. The resulting compound was filtered at 65° C., washed first with nitrobenzene then with ethyl alcohol and finally dried. There resulted a yellow vat dye which dyed cotton in yellow shades from a red-brown sodium hydrosulfite vat. This anthraquinone vat color gives yellow sulfuric acid solutions.

*Example VIII*

Ten (10) parts of 1-amino-6-anthraquinoyl-amino-(1')-anthraquinone-5'-amine was anisylated by treating with 10 parts of anisyl chloride (para-methoxy-benzoic acid chloride) in 250 parts of nitrozenzene at 155° C. for 2 hours. There resulted a yellow dye which was filtered at 65° C. and dried after washing first with nitrobenzene and then with ethyl alcohol. The resulting product dissolved in concentrated sulfuric acid to give a yellow to orange color and forms a red-brown hydrosulfite vat from which cotton may be dyed in yellow shades.

*Example IX*

Ten (10) parts of 1-amino-6-anthraquinoyl-amino-(1')-anthraquinone-5'-amine was heated with 10 parts of benzoic acid anhydride in 250 parts of tri-chloro-benzene at 150°–160° C. for 2 hours. The resulting compound was filtered at 70° C., washed first with tri-chloro-benzene and then with ethyl alcohol and finally dried. The resulting product was substantially identical with that obtained according to Example VI.

*Example X*

Ten (10) parts of 1-amino-6-anthraquinoyl-amino-(1')-anthraquinone-5'-amine was heated with 300 parts of acetic acid anhydride at the boiling point for 2–3 hours. The resulting yellow crystalline product which separated from the reaction mixture was filtered, washed first with solvent naphtha and then with ethyl alcohol and finally dried.

*Example XI*

Ten (10) parts of 1-amino-6-anthraquinoyl-amino-(1')-anthraquinone-5'-amine was treated with 9 parts of para-toluic acid chloride in 250 parts of nitrobenzene at 155°–160° C. for two hours. The resulting solid was filtered from the reaction mass at 65°–70° C., washed with nitrobenzene then with ethyl alcohol and finally dried. There resulted a yellow vat color which could be used either as a pigment or for the dyeing of cotton from alkaline hydrosulfite vats.

The acylation is, of course, not limited to the specific compounds utilized according to the above examples. The acid chlorides of the benzene series have proved especially valuable. In addition to those halides previously set out, mention may be made of the nitro-benzoyl chlorides (o, m, and p) and the phthaloyl halides, for example tere-phthaloyl chloride, pipicolinic acid chloride, 5-chloro-isatin-7-carbonyl-chloride, 3-hydroxy-thionaphthene-6-carboxylic acid chloride, 4-ethoxy-3-hydroxy-thionaphthene-7-carboxylic acid chloride, and the like. Acid compounds of the condensed ring systems for example the naphthalene, anthracene, anthraquinone, benzanthrone and related series (see Anthracene and Anthraquinone by Barnett 1921), also give desirable results.

During the acylation step it has been noted particularly that substantial increases in time for the reaction are required at lower temperatures. Temperatures above 90° C. are preferred and it has been found that at temperatures below 40° C. particular difficulty in completing the reaction satisfactorily is encountered. Under such conditions a highly complex condensation product appears to be formed.

As will be clear from the examples, the amount of solvent or suspension agent (if any) used for carrying out the various reactions may be varied over a wide range depending largely upon the characteristics of the particular reaction and the convenience of the person carrying out the same. Particular mention may be made of such reaction media as nitrobenzene, the chloro-benzene (particularly tri-chloro-benzene), the xylenes (for example commercial xylenes), naphthalene, solvent naphtha, and the like.

The particular temperatures and the time utilized for the various condensations and conversions also depend upon the characteristics of the substances being treated. Temperatures higher than room or atmospheric temperatures are usually used because of the influence of temperature on the speed of the reaction. High yields are to some extent dependent upon selected temperature ranges which may readily be determined empirically. Obviously temperatures high enough to cause substantial decomposition of the reactants would not be economical.

The compound 1-nitro-6-anthraquinoyl-amino-(1')-anthraquinone-5'-amine is much more insoluble that 1,5-diamino-anthaquinone at higher temperatures and it has been found that a purer product is obtained according to the procedure outlined in Example I (as compared with that outlined in Example II).

The new dyes although prepared directly in an excellent state of purity, may be further purified by crystallization from concentrated sulfuric acid, by acid pasting (a practice well-known in the art) followed by heating in aqueous suspension in the presence of chromic acid or alkaline hypochlorite. Other methods of purification are well-known to those skilled in the art and may be used when desired (see Enzyklopadie der Kupenfarbstoffe by Truttwin 1920).

Throughout the specification and claims the term "vat color" is used to cover compounds susceptible to vatting by any of the methods known to the art (see Color Index). It includes vat dyes and vattable compounds which are not dyes.

In the course of the specification, certain formulae have been given for the purpose of aiding in understanding the invention. These formulae have not been proven except by the processes herein described and therefore it is not desired to limit the invention to the same.

The new compounds produced by this invention are very stable and produce valuable dyestuffs as indicated in the specific examples. The group of compounds disclosed is outstanding in the general field to which it belongs. The compounds are especially valuable because they cover a range of shades not adequately filled at present in the vat dye field.

As many apparently widely different embodiments of this invention may be made without departing from the spirit and scope thereof, it is to be understod that I do not limit my self to the specific embodiments thereof except as defined in the appended claims.

I claim:
1. The process which comprises condensing only one mol. of a halide of 1-nitro-anthraquinone-6-carboxylic acid with one mol. of 1,5-diamino-anthraquinone and thereafter reducing the nitro group in the condensation product to an amino group.

2. The process which comprises condensing only one mol. of a halide of 1-nitro-anthraquinone-6-carboxylic acid with one mol. of 1,5-diamino-anthraquinone, reducing the nitro group in the condensation product to an amino group and thereafter acylating the resulting compound.

3. The process which comprises condensing only one mol. of a halide of 1-nitro-anthraquinone-6-carboxylic acid with one mol. of 1,5-diamino-anthraquinone, reducing the nitro group in the condensation product to an amino group and thereafter acylating, with an acid halide of the benzene series, the resulting compound.

4. The process which comprises adding 10 parts of 1,5-diamino-anthraquinone to 200 parts of nitrobenzene, heating for a period of 1–2 hours at a temperature of 170° C., adding 13.3 parts of 1-nitro-anthraquinone-6-carbonyl chloride, maintaining the temperature at 170° C. for ½ to 1 hour, cooling to 30°–40° C., filtering, washing the filter cake with a mixture of nitrobenzene and ethyl alcohol, washing with ethyl alcohol, suspending the washed filter cake in 1500–2000 parts of a 30% ethyl alcohol solution, adding 100 parts of a 30–35% sodium sulfhydrate solution, heating the same at the boiling point for 2–4 hours, filtering while hot, washing with hot water, drying, suspending the dried filter cake in 250 parts of nitrobenzene, heating for ½ hour at 110° C., adding 12 parts of benzoyl chloride, maintaining a temperature of 150° C. for 2 hours, filtering the resultant at 60° C., washing with nitrobenzene, washing with alcohol and drying.

5. The compound probably having the formula:

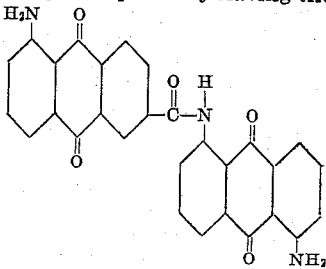

6. The process which comprises condensing only one mol. of a member of the group consisting of 1-nitro-anthraquinone-6-carbonyl chloride and 1-nitro-anthraquinone-6-carbonyl bromide with one mol. of 1,5-diamino-anthraquinone and thereafter reducing the nitro group in the condensation product to an amino group.

7. The process which comprises condensing only one mol of 1-nitro-anthraquinone-6-carboxylic acid chloride with one mol. of 1,5-diamino-anthraquinone, reducing the nitro group in the condensation product to an amino group and thereafter acylating the resulting compound.

8. The process which comprises condensing only one mol. of 1-nitro-anthraquinone-6-carboxylic acid chloride with one mol of 1,5-diamino-anthraquinone, reducing the nitro group in the condensation product to an amino group with sodium sulfhydrate and thereafter acylating, with an acid halide of the benzene series, the resulting compound.

9. The process which comprises adding 10 parts of 1,5-diamino-anthraquinone to 200 parts of nitrobenzene, adding over a period of ½ hour at a temperature of 170° C. 13.3 parts of 1-nitro-anthraquinone-6-carbonyl chloride, maintaining the temperature at 170° C. for ½ to 1 hour, cooling to 30°–40° C., filtering, washing the filter cake with a mixture of nitrobenzene and ethyl alcohol, washing with ethyl alcohol, suspending the washed filter cake in 1500–2000 parts of a 30% ethyl alcohol solution, adding 100 parts of a 30–35% sodium sulfhydrate solution, heating the same at the boiling point for 2–4 hours, filtering while hot, washing with hot water, drying, suspending the dried filter cake in 250 parts of nitrobenzene, heating for ½ hour at 110° C., adding 12 parts of benzoyl chloride, maintaining a temperature of 150° C. for 2 hours, filtering the resultant at 60° C., washing with nitrobenzene, washing with alcohol and drying.

EARL EDSON BEARD.